Feb. 27, 1962 H. RUSKIN 3,022,508

TAG FEEDING MECHANISM

Filed May 26, 1959 10 Sheets-Sheet 1

INVENTOR.
HENRY RUSKIN
BY J. Walton Bader
ATTORNEY

Feb. 27, 1962 H. RUSKIN 3,022,508

TAG FEEDING MECHANISM

Filed May 26, 1959 10 Sheets-Sheet 2

INVENTOR.
HENRY RUSKIN

BY J. Walton Bader
ATTORNEY

Feb. 27, 1962 H. RUSKIN 3,022,508

TAG FEEDING MECHANISM

Filed May 26, 1959 10 Sheets-Sheet 3

INVENTOR.
HENRY RUSKIN

BY J. Walton Bader
ATTORNEY

Feb. 27, 1962

H. RUSKIN 3,022,508

TAG FEEDING MECHANISM

Filed May 26, 1959

10 Sheets-Sheet 4

INVENTOR.
HENRY RUSKIN

BY J. Walton Bader

ATTORNEY

INVENTOR.
HENRY RUSKIN
BY J. Walton Bader
ATTORNEY

Feb. 27, 1962 H. RUSKIN 3,022,508

TAG FEEDING MECHANISM

Filed May 26, 1959 10 Sheets-Sheet 6

INVENTOR.
HENRY RUSKIN

BY J. Walton Bader
ATTORNEY

TAG FEEDING MECHANISM

Filed May 26, 1959 10 Sheets-Sheet 7

INVENTOR
HENRY RUSKIN
BY J. Walton Bader
ATTORNEY

Feb. 27, 1962 H. RUSKIN 3,022,508

TAG FEEDING MECHANISM

Filed May 26, 1959 10 Sheets-Sheet 8

INVENTOR.
HENRY RUSKIN

BY J. Walton Bader
ATTORNEY

Feb. 27, 1962 H. RUSKIN 3,022,508

TAG FEEDING MECHANISM

Filed May 26, 1959 10 Sheets-Sheet 9

INVENTOR.
HENRY RUSKIN

BY J. Walton Bader

ATTORNEY

Feb. 27, 1962 H. RUSKIN 3,022,508

TAG FEEDING MECHANISM

Filed May 26, 1959 10 Sheets-Sheet 10

INVENTOR.
HENRY RUSKIN

BY J. Walton Bader

ATTORNEY

United States Patent Office 3,022,508

Patented Feb. 27, 1962

3,022,508
TAG FEEDING MECHANISM

Henry Ruskin, Bayside, N.Y., assignor to Swingline, Inc., Long Island City, N.Y., a corporation of New York Filed May 26, 1959, Ser. No. 815,927
10 Claims. (Cl. 1—3)

This invention relates to a tag feeding mechanism and also to an electric stapling machine construction of which the tag feeding mechanism is a part. Where the device is used in combination with an electric stapling machine the type of machine disclosed in the issued United States Patent Number 2,866,973 to Henry Ruskin is the type of electric stapling machine employed.

Where the device is employed in connection with an electric stapling machine automatic actuation of the machine is produced as soon as the tag is placed in fastening position. However, in order to prevent actuation if a tag is not properly fed into position, additional switch mechanism is employed which is only actuable by the tag itself when the tag is in proper fastening position. Thus, if the tag is not properly fed, the machine will not actuate and stapling will not occur.

The tag feeding mechanism itself contains a number of novel features. One of the most significant points of novelty resides in feeding the topmost member of the series of tags through a space within the guide members for the tag. This space is made larger than the thickness of one tag but less than the thickness of two tags with the optimum space being the thickness of one and one half tags. Thus one tag feeds through the space easily while two tags cannot go through.

Also, in order to provide even better feeding through the aforesaid space but not to allow two tags to feed at the same time the top face of the guide member is made arcuate in form and the portion spaced therefrom is formed with a downwardly depending arcuate portion. The space equivalent to more than the thickness of one tag is determined by the clearance between the arcuate portions. Thus, if a tag is bent, it is guided through the space since the space is initially quite wide and thereafter narrows. Also the tag is easily withdrawn from the space after stapling occurs since the space again widens after the narrowest point is reached on the other side of the guide member.

The construction has further advantages as well. In the tag art to which this invention pertains tags are made of different width. With the construction of this invention the guide members are made pivotally movable and are positionable in at least two different positions. The guide members thus form a channel automatically aligning the proper width of tag with the anvil of the device regardless of the width that is used. Furthermore spaced pairs of tag engaging portions are provided upon the tag propelling member so that automatic alignment of these portions with the rear side of the tag is provided regardless of the size of tag employed.

While the above sets forth the principal advantages of the instant invention there are a number of other advantages as well. For example the device is easily loaded since the container opens rather simply. The tag propelling member is longitudinally movable producing further simplicity of operation. Automatic actuation of the switch means to actuate the device occurs after the tag propelling member reaches its extreme forward position, the construction is relatively inexpensive and sturdy and other advantages are apparent to those skilled in this art.

A detailed description of the instant invention and the best mode known to the inventor for carrying out the same will be set forth by reference to the accompanying drawings which are made a part of this specification.

However it must be understood that the specific examples of the invention set forth in the foregoing specification are for illustrative purposes and for purposes of example only. Various changes and modifications can obviously be made within the spirit and scope of this invention and would occur to one skilled in this art.

Figure 1:
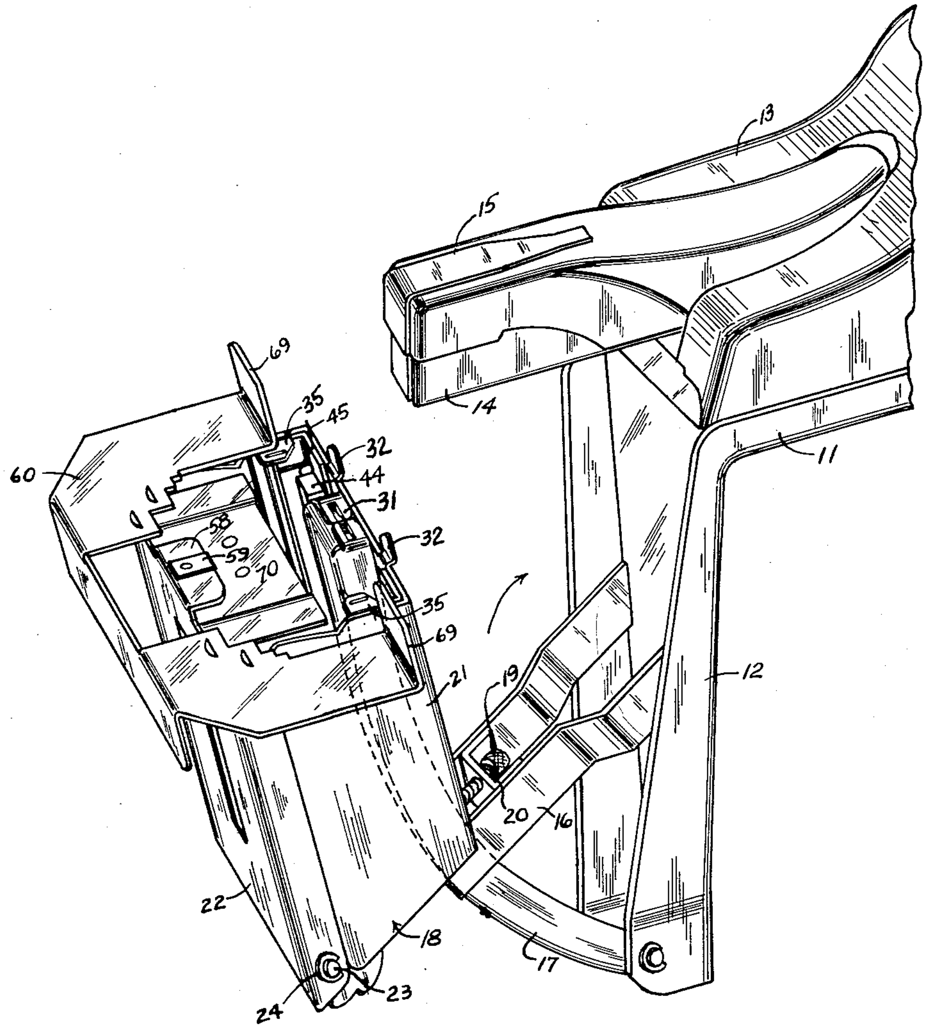
FIG. 1 is a perspective view of the tag attaching mechanism of this invention and its accompanying electric stapling machine. However the tag attaching mechanism is pushed away from its normal position under the head of the machine for clarity of illustration of the parts.

Referring now to the drawings for a detailed description of the invention there is shown a support 11 which is formed with a downwardly depending leg portion 12. A casing 13 is mounted upon the upper part of support 11 and a stapling machine head 14 is pivotally mounted upon casing 13 by means of a pivot bar (not shown). A cap 15 is also mounted upon the pivot bar (not shown) and is pivotally movable with respect to the head 14 so as to drive a staple when actuated. The construction of the stapling machine is disclosed in the previously mentioned patent.

Figure 6:
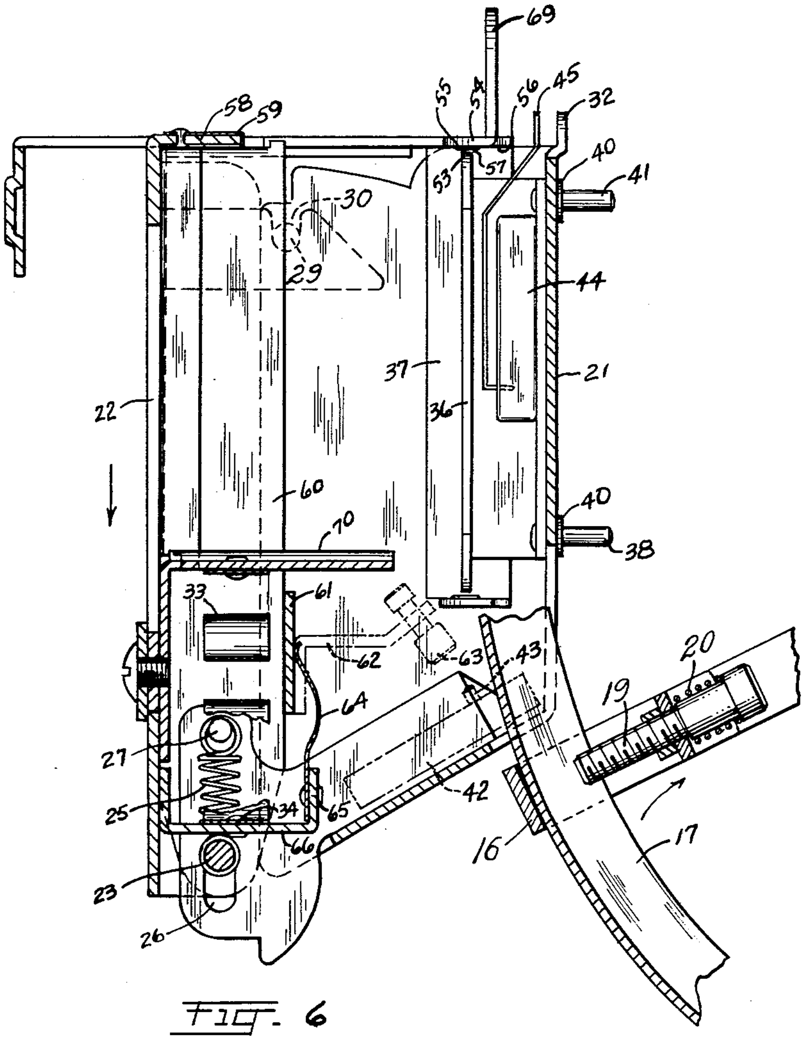
FIG. 6 is a side sectional view of the tag attaching mechanism of the invention taken along lines 6—6 of FIG. 2.
Figure 7:
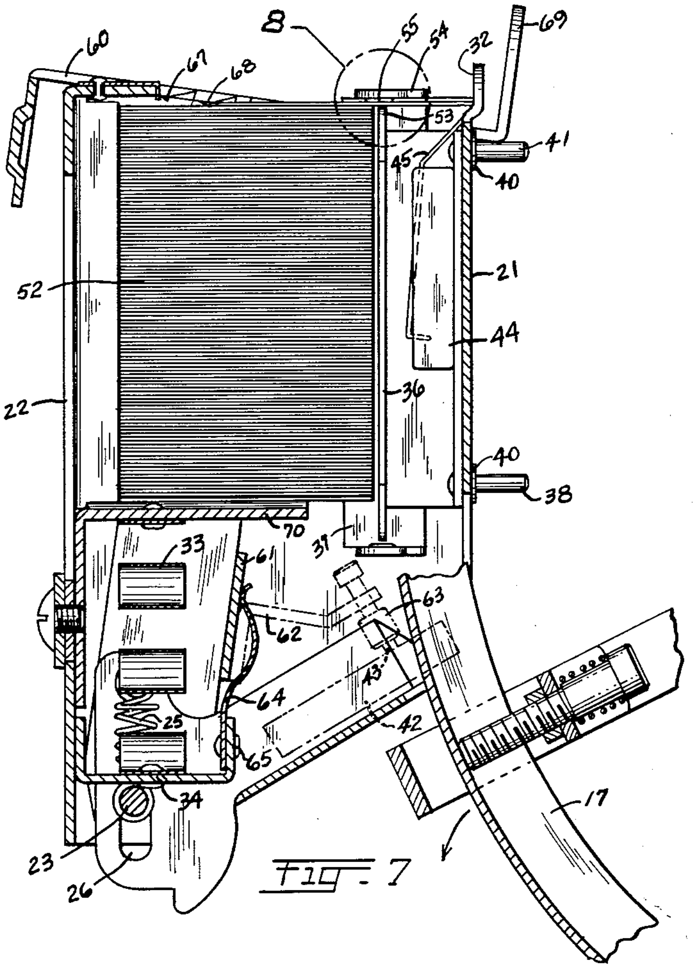
FIG. 7 is a side view, partly in section, showing the interior of the container with tags disposed therein. The topmost tag is shown in the position that it assumes when it passes over the anvil in position for stapling.
Figure 8:
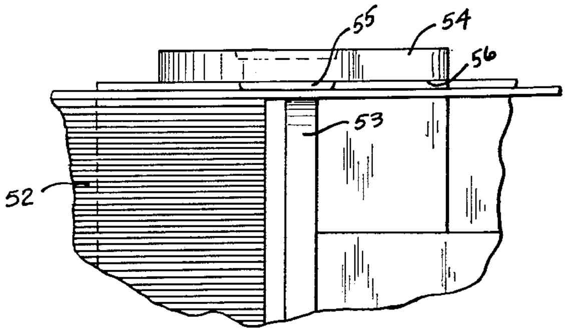
FIG. 8 is a detail view of the area 8 of FIG. 7 on an enlarged scale.

A support 16 is secured to leg 12 and embraceably encompasses support 17. Support 17 is in turn secured to container 18. Set screw 19 controls the spacing between supports 16 and 17 with respect to one another and thereby controls the swing of container 18 with respect to stapling head 14 (FIG. 6). A spring 20 is also provided about set screw 19 so as to prevent movement of the screw when the device is being used.

Container 18 includes a forward portion 21 and a rearward portion 22. Rear portion 22 is pivotally movable with respect to forward portion 21 about pin 23 which is held in place by snap rings 24. Pin 23 is disposed in slots 26 within forward portion 21 of container 18 and also extends through portions 22 as shown in FIG. 1. A pair of springs 25 are secured to pin 23 and to supports 27 within forward portion 21 of container 18 and serve to hold the parts in proper alignment.

Figure 10:
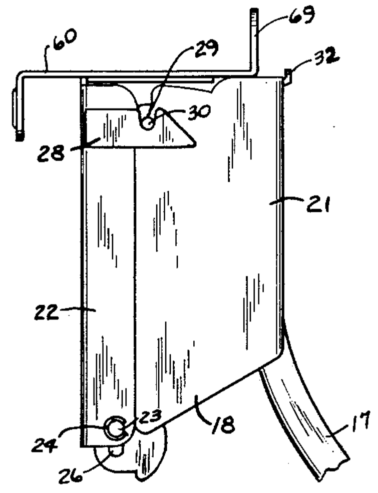
FIG. 10 is a side view of the container in closed position.
Figure 11:
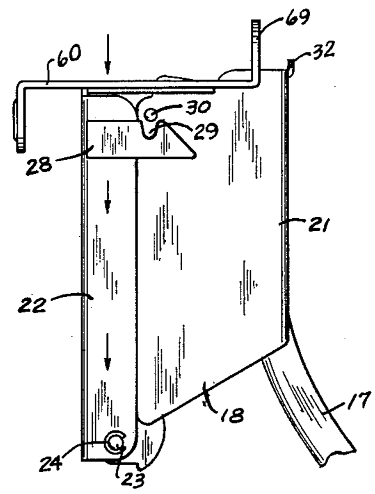
FIG. 11 is a view similar to FIG. 10 but showing the first stage of opening the container to load the same.
Figure 12:
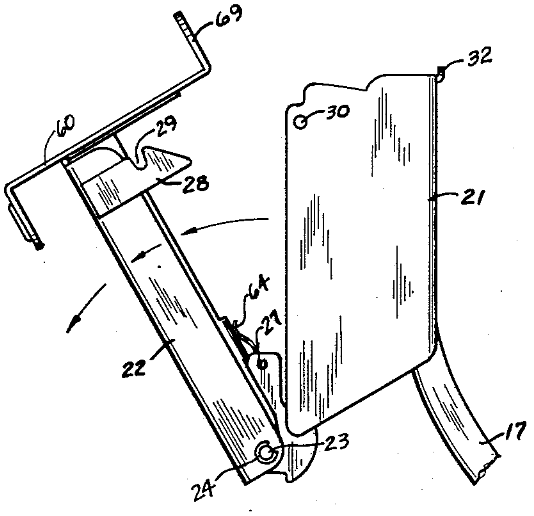
FIG. 12 is a view similar to FIGS. 10 and 11 but showing the container in open position.
Figure 13:
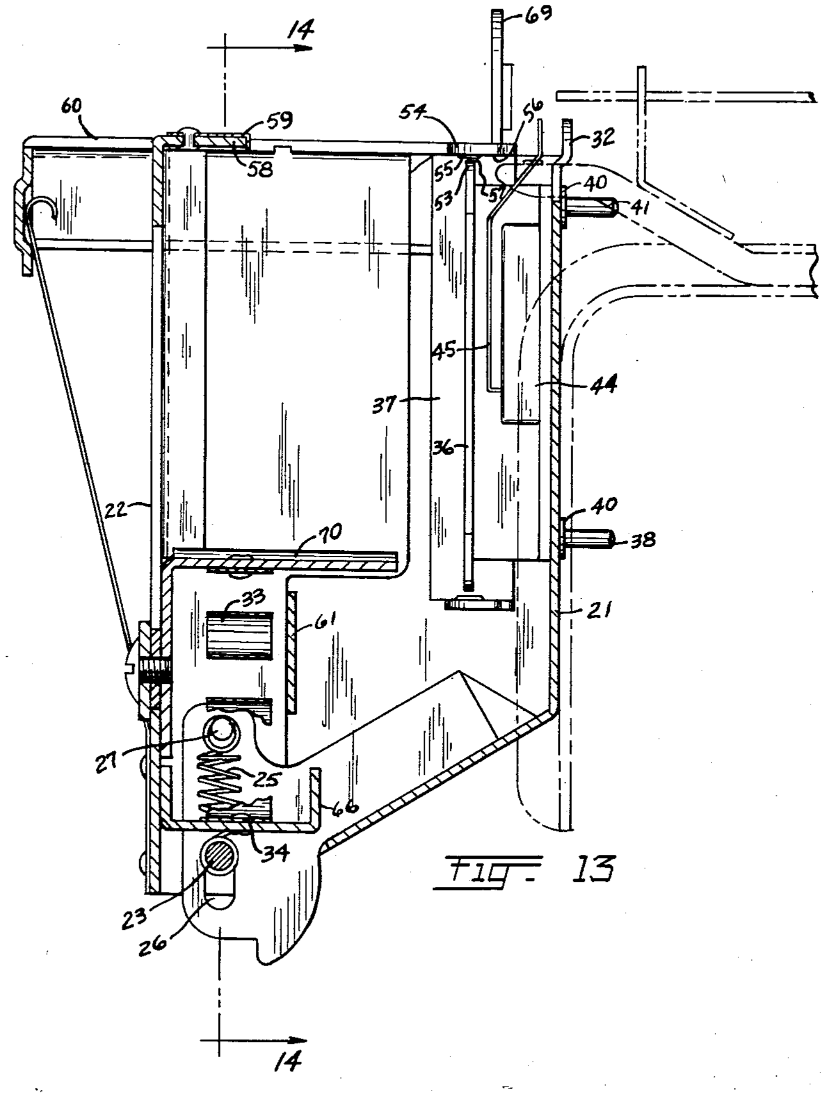
FIG. 13 is a side view, partly in section, showing the guide members in the position that they assume when tags of maximum width are to be placed therein. This figure also shows an alternative type of spring that can be used in connection with the tag propelling member.

Latches 28 are provided to hold the front and rear portions of container 18 in position (FIGS. 10–12). These latches are provided on each side of container 18 and are secured to the rear portion 22 thereof. Latches 28 are provided with recesses 29 which are adapted to engage pins 30 secured to the forward portion 21 of container 18.

An anvil 31 is formed on the upper end of support 17 within container 18 and is disposed directly beneath stapling head 14. A pair of upwardly directed supports 32 extend upwardly from forward portion 21 of container 18 to aid in positioning the tag immediately prior to stapling thereof.

A tag positioning member 70 is disposed within container 18 and is upwardly movable therewithin. A leaf spring 33 is secured to positioning member 70 and to a holder 65, attached to rear portion 22.

A pair of guide members 35 are also provided. Guide members 35 are each formed with a laterally projecting portion 36 which extends along the length thereof and base portion 37 which base portion is adjacent a side of forward portion 21.

Guide members 35 are each laterally pivotally movable about pins 38. Each of guide members 35 are provided with a pin 41 at the upper portion thereof. A pair of elongated recesses 39 are disposed laterally on the rear portion 22 of container 18 with each of pins 41 disposed within a recess 39. A spring washer 40 is disposed about each of pins 38 and 41.

Each of guide members 35 are adapted to guide a side 51 of the tags 52.

The laterally projecting portions 36 of each of guide members 35 are formed with an arcuate upper face 53. An overlying portion 54 is formed on the lower face 56 of overlying portion 54. A space 57 is provided between downwardly depending portion 55 and upper face 53. This space is at least equal to the thickness of one tag but should be less than the thickness of two tags with the preferred spacing being the thickness of one and one-half tags.

It is important to note that in the perferred modification of this invention the arcuate upper face of guide members 35 and the arcuate downwardly depending portion 55 are only arcuate in longitudinal cross section taken parallel to anvil 31.

A switch 42 is disposed within container 18 and is provided with a button-type throwing arm 43. A second switch 44 is also disposed within container 18 and is provided with an upstanding trigger-type throwing arm 45 located adjacent anvil 31.

Figure 15:
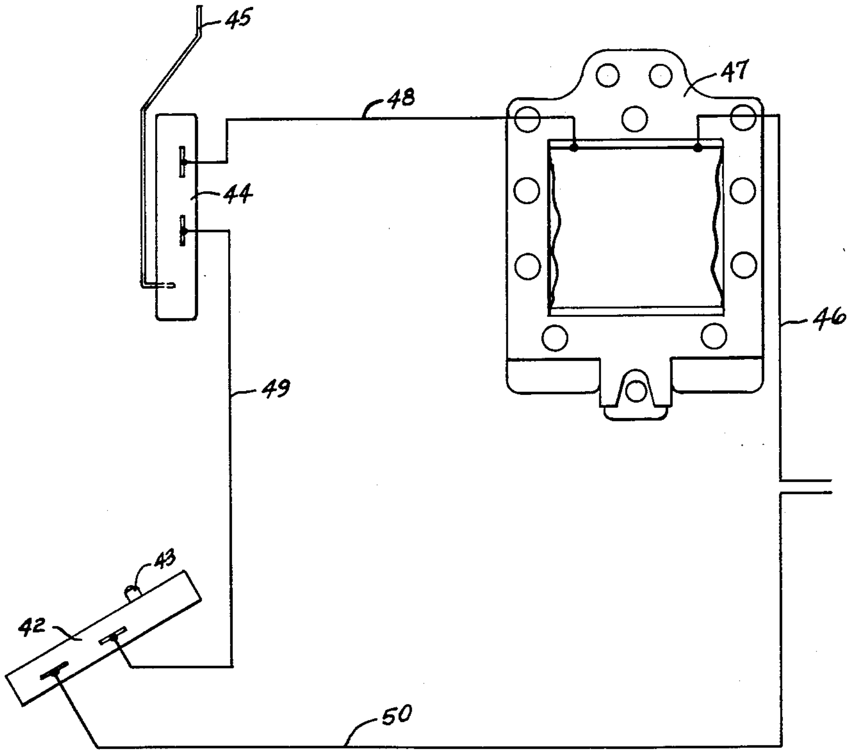
FIG. 15 is a diagrammatic view of the electrical circuit employed when a pair of switches is used to insure proper actuation of the stapling machine.

Switches 42 and 44 must both be closed to actuate the electrically driven stapling machine to which the tag feeding portion of this invention is secured. The circuit is shown in FIG. 15 and consists of wire 46 (that is connected to one side of a power source) solenoid 47 of the stapling machine, wire 48, switch 44, wire 49, switch 42, and wire 50 which returns to the other side of the power source.

In order to aid in holding tags 52 within container 18 a tag holding abutment 58 comprising a forwardly bent-over portion of the upper edge of rear portion 22 is provided. A projection 59 may also be secured to abutment 58 so as to provide a smaller surface in contact with the tags 52.

Figure 4:
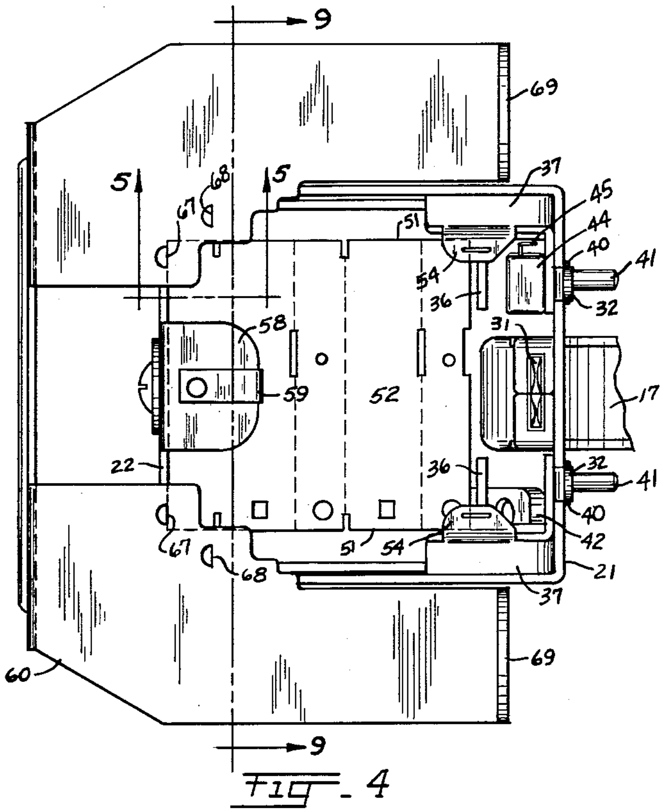
FIG. 4 is a top plan view similar to that of FIG. 2 but where tags of minimum width are disposed within the container of the device.
Figure 5:
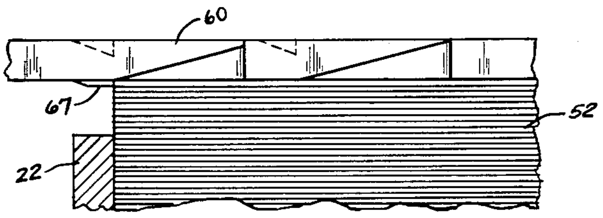
FIG. 5 is a sectional view on an enlarged scale taken along lines 5—5 of FIG. 4.

A transversely and forwardly movable tag propelling member 60 is provided. Tag propelling member 60 consists of a flat plate having a cut-out portion and depending legs. The legs of tag propelling member 60 are joined to one another by a cross member 61. Cross member 61 is positioned below the lowermost position of positioning member 70 and has attached thereto an arm 62 which carries switch actuator 63. The flat plate has two pair of tag actuating portions 67 and 68 formed on the lower surface thereof. Each pair of tag actuating portions is spaced laterally and forwardly of the cut-out portion of the plate to engage respectively tags of different sizes. Switch actuator 62 is adapted to abut arm 43 of switch 42 and close the same at the proper time. A leaf spring 64 is secured to container 18 at 65 located on holder 66 and produces tension against cross member 61 so as to provide return spring means for tag propelling member 60. It is noted that the rearmost position of tag propelling member 60 is back further than is shown in FIGS. 1 and 4 of the drawings so as to permit tag propelling member 60 to clear the top edge of 21 and 35 so as to permit forward portion 21 of container 18 and rearward portion 22 of container 18 to be spread apart. Tag actuating portions 67—67 are operative when small width tags are employed, while tag actuating portion 68—68 are operative when large width tags are employed.

A pair of upstanding handles 69—69 are also employed to aid in moving tag propelling member 60 forwardly when the device is being used.

With the foregoing detailed description of this invention the operation thereof will now be explained.

Figure 2:
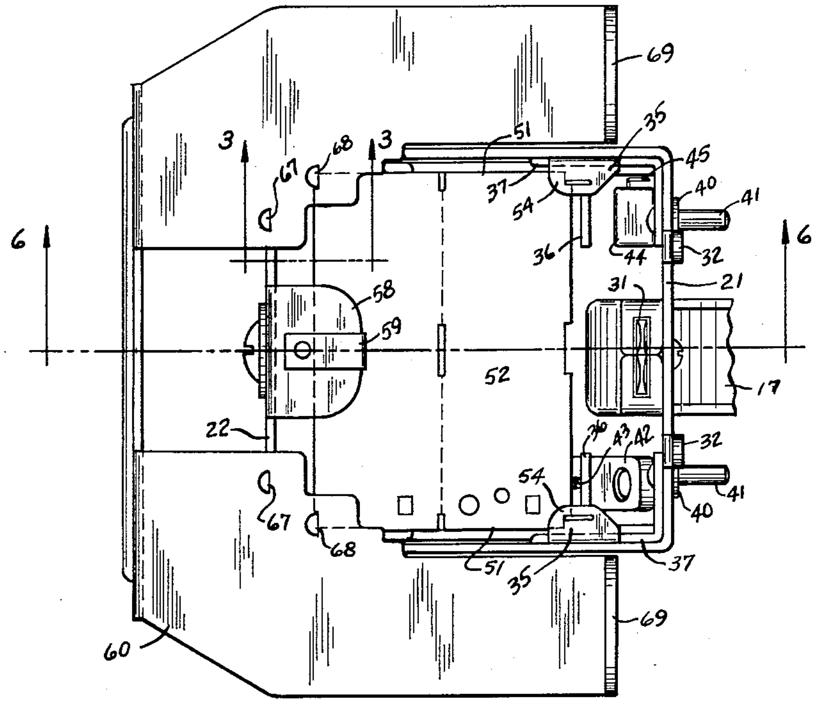
FIG. 2 is a top plan view of the tag feeding mechanism of this invention with tags of maximum width disposed within the container thereof.
Figure 3:
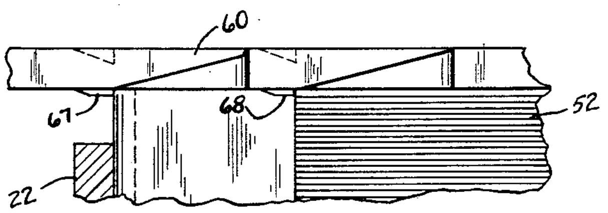
FIG. 3 is a sectional view on an enlarged scale of the device taken along lines 3—3 of FIG. 2.
Figure 9:
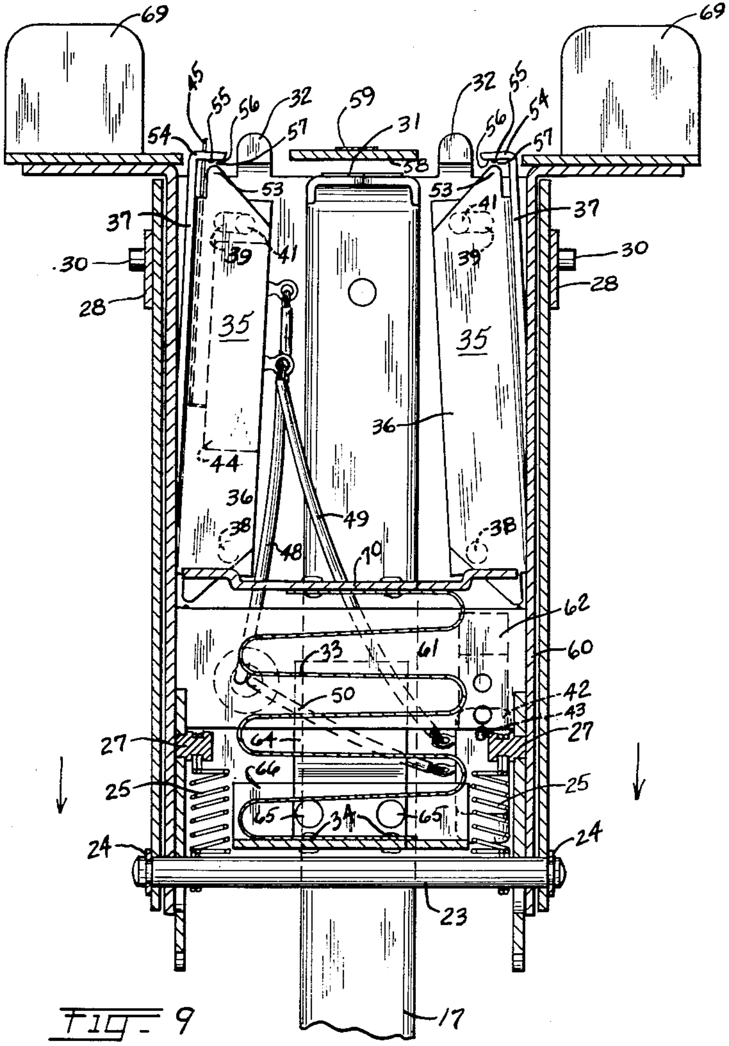
FIG. 9 is a sectional view taken along lines 9—9 of FIG. 4 showing the guide members in the position that they assume when small size tickets are placed within the container.
Figure 14:
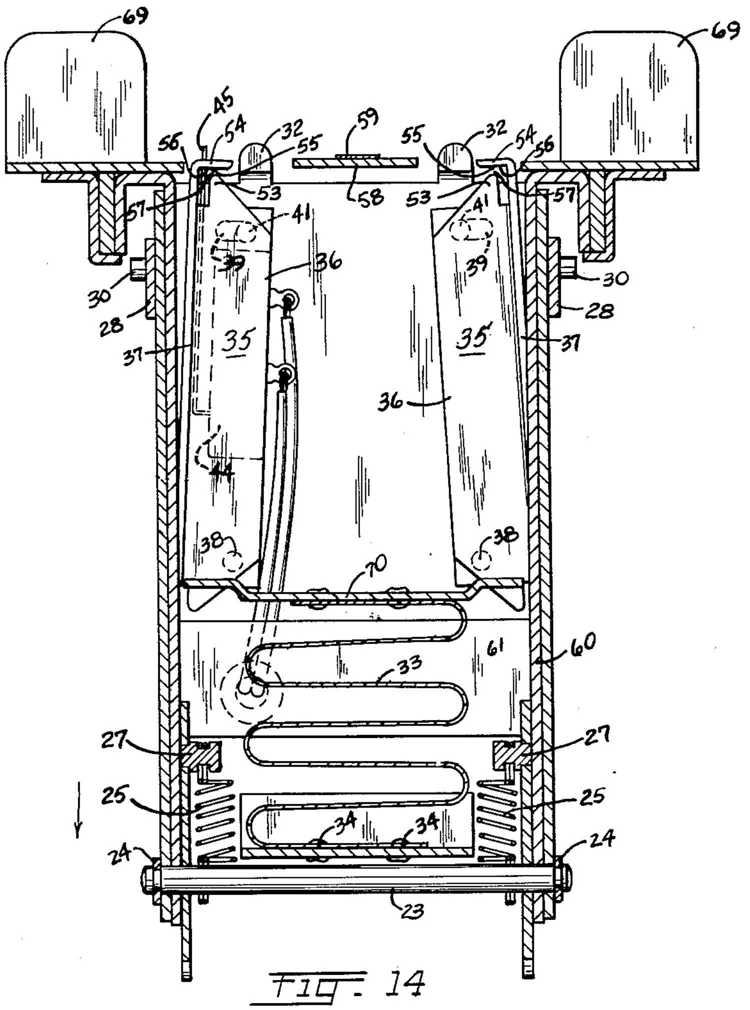
FIG. 14 is a sectional view taken along lines 14—14 of FIG. 13. In this figure, as in FIGS. 6 and 9 the tag positioning member of the device or "follow block" is shown in "down" position but the tags that normally would hold such follow block into down position are eliminated for clarity of illustration.

Set screw 19 is adjusted to align anvil 31 beneath stapling head 14. Rear portion 22 of container 18 is normally held in abutting close position with forward portion 21 of container 18 by the pressure of springs 25 which hold the parts in aligned relationship so that pins 30 interlock with recesses 29. However if downward pressure is placed upon portion 22 in the direction of the arrows shown in FIGS. 1, 9, and 14 so as to overcome the pressure of springs 25 then pins 30 will be displaced from recesses 29 and a twist as shown in FIG. 12 will disengage the upper portion of rear portion 22 from the remainder of the container. While this is being done pin 23 is moved along slots 26. The container 18 is then opened as shown in FIG. 12 and the series of tags to be loaded in the device are selected. If the tags are of large width then guide members 35 are manually placed in the position shown in FIG. 2 of the drawings while if the tags are of small width then guide members 35 are placed in the position shown in FIG. 4 of the drawings.

Container 18 is now closed. As can be now seen the tags 52 are held on two sides by guides 35 and the rear side of the upper tag bears against portions 67—67 or 68—68 of tag propelling member 60. A garment (not shown) to which a tag is to be attached is introduced by bringing its forward edge into abutting relationship with handles 69 of tag propelling member 60. Tag propelling member 60 is now moved forwardly pushing tag 52 forwardly through space 57 and over anvil 31. Since space 57 is preferably less than the width of two tags only a single tag can be fed through this space. As tag propelling member 60 reaches its most forward point actuator 63 engages arm 43 and switch 42 is actuated. However unless tag 52 also engages arm 45 of switch 44 the stapling machine will not fire. However, assuming proper positioning of tag 52 then stapling occurs. The garment and tag are then removed. At that point follow block 70 pushes another tag 52 into position after tag propelling member 60 is returned by spring 64. The process is then repeated.

If tags of small width are employed the process is identical and the positions of guides 35 will still cause proper feeding to occur.

I claim:

1. A tag feeding mechanism for use with a fastening device comprising a container adapted to hold a series of tags in vertically stacked relationship therewithin, an anvil upon said container, a pair of laterally aligned guide members within said container, each of said guide members being adjacent a side of said container and adapted to engage a side of said tags, a spring propelled vertically movable tag positioning member adapted to lie in abutting relationship with the lowermost member of said series of tags, said tag positioning member being laterally spaced from said guide members, and a transversely movable tag propelling member in operative relationship with the topmost member of said series of tags adapted to propel said topmost member away from said stack of tags and into fastening position over said anvil.

2. A tag feeding mechanism for use with a fastening device comprising a container adapted to hold a series of tags in vertically stacked relationship therewithin, an anvil upon said container, a pair of laterally aligned guide members within said container, each of said guide members being adjacent a side of said container and adapted to engage a side of said tags, each of said guide members having a laterally projecting portion and an overlying portion spaced from said laterally projecting portion by at least the thickness of one tag, a spring propelled vertically movable tag positioning member spaced both transversely and laterally from said guide members and adapted to lie in abutting relationship with the lowermost member of said series of tags, and a transversely movable tag propelling member in operative relationship with the topmost member of said series of tags adapted to propel said topmost member away from said stack of tags through the space between said overlying portion and laterally projecting portion of said guide members and into fastening position over said anvil.

3. A tag feeding mechanism for use with a fastening device comprising a container adapted to hold a series of tags in vertically stacked relationship therewithin, an anvil forwardly disposed upon said container, a pair of laterally aligned guide members within said container, each of said guide members being adjacent a side of said container and adapted to engage a side of said tags, each of said guide members having a laterally projecting portion and an overlying portion spaced from said laterally projecting portion by at least the thickness of one tag, a tag holding abutment upon said container rearward of said guide members, a spring propelled vertically movable tag positioning member spaced both transversely and laterally from said guide members, said tag positioning member being adapted to lie in abutting relationship with the lowermost member of said series of tags, and a transversely movable tag propelling member in operative relationship with the topmost member of said series of tags adapted to propel said topmost member away from said stack of tags through the space between said overlying portion and laterally projecting portion of said guide members and into fastening position over said anvil.

4. A tag feeding mechanism for use with a fastening device comprising a container adapted to hold a series of tags in vertically stacked relationship therewithin, an anvil forwardly disposed upon said container, a pair of laterally aligned guide members within said container, each of said guide members being adjacent a side of said container and adapted to engage a side of said tags, each of said guide members having a laterally projecting portion extending along the length thereof and an overlying portion spaced from the top of said laterally projecting portion by at least the thickness of one tag but less than the thickness of two tags, said overlying portion also having a downwardly depending arcuate portion on its lower face, said arcuate portion determining the space between said laterally projecting portion and said overlying portion; a tag holding abutment upon said container rearward of said guide members, a spring propelled vertically movable tag positioning member spaced both transversely and laterally from said guide members, said tag positioning member being adapted to lie in abutting relationship with the lowermost member of said series of tags, and a transversely movable tag propelling member in operative relationship with the topmost member of said series of tags adapted to propel said topmost member away from said stack of tags through the space between said overlying portion and laterally projecting portion of said guide members and into fastening position over said anvil.

5. A tag feeding mechanism for use with a fastening device comprising an openable container adapted to hold a series of tags invertically stacked relationship therewithin, an anvil forwardly disposed upon said container, a pair of laterally aligned pivotally movable guide members within said container, each of said guide members being adjacent a side of said container and adapted to engage a side of said tags, each of said guide members having a laterally projecting portion extending along the length thereof and formed with an arcuate upper face and an overlying portion formed with a downwardly depending portion upon its lower face, said downwardly depending portion being arcuate in form, said arcuate upper face of said laterally projecting portion and arcuate downwardly depending portion upon said overlying portion being spaced from one another by at least the thickness of one tag but less than the thickness of two tags; means for positioning said guide members upon said container; a tag holding abutment upon said container rearward of said guide members, a spring propelled vertically movable tag positioning member spaced both transversely and laterally from said guide members, said tag positioning member being adapted to lie in abutting relationship with the lowermost member of said series of tags, a transversely movable tag propelling member having tag engaging portions thereupon in operative registration with the positions of said guide members upon said container, said tag propelling member being in operative relationship with the topmost member of said series of tags and adapted to propel said topmost member away from said stack of tags through the space between said overlying portion and laterally projecting portion of said guide members into fastening position over said anvil.

6. A tag feeding mechanism for use with a fastening device comprising an openable container having a forward portion and a pivotally movable rear portion, fastening means upon said rear portion and complementary fastening means upon said forward portion, spring means upon said container normally urging said forward and rear portions into locked relationship; an anvil forwardly disposed upon the forward portion of said container, said contatiner being also adapted to hold a series of tags in vertically stacked relationship therewithin, a pair of laterally aligned pivotally movable guide members within said container, each of said guide members being adjacent a side of said container and adapted to engage a side of said tags, each of said guide members having a laterally projecting portion extending along a length thereof and formed with an arcuate upper face and an overlying portion formed with a downwardly depending arcuate portion upon its lower face, said arcuate upper face of the laterally projecting portion and the downwardly depending portion upon said overlying portion being spaced from one another by the thickness of one and one half tags; means for positioning said guide members upon said container; a tag holding abutment upon said container rearward of said guide members, a spring propelled vertically movable tag positioning member spaced both transversely and laterally from said guide members, said tag positioning member being adapted to lie in abutting relationship with the lowermost member of said series of tags, a transversely and forwardly movable tag propelling member having spaced pairs of tag engaging portions thereupon, one of said pairs of tag engaging portions being adapted to abut the rear side portion of the topmost member of the series of tags within said container, each pair of tag engaging portions being in operative registration with the positions taken by said guide members upon said container, said tag propelling member being also in operative relationship with the topmost member of said series of tags and adapted to propel said topmost member away from said stack of tags through the space between said overlying portion and laterally projecting portion of said guide members and into fastening position over said anvil.

7. A tag feeding mechanism for use with an electric stapling machine comprising an openable container having a forward portion and a pivotally movable rear portion, fastening means upon said rear portion and complementary fastening means upon said forward portion, spring means upon said container normally urging said forward and rear portions into locked relationship, said container being adapted to hold a series of tags in vertically stacked relationship therewithin, an anvil upon said container, a pair of laterally aligned pivotally movable guide members within said container, each of said guide members being adjacent a side of said container and adapted to engage a side of said tags, each of said guide members having a laterally projecting portion extending along the length thereof and formed with an arcuate upper face and an overlying portion formed with a downwardly depending arcuate portion upon its lower face, said arcuate upper face of the laterally projecting portion and the downwardly depending portion upon said overlying portion being spaced from one another by the thickness of one and one half tags; means for positioning said guide members upon said container; a tag holding abutment upon said container rearward of said guide members, a spring propelled vertically movable tag positioning member spaced both transversely and laterally from said guide members, said tag positioning member being adapted to lie in abutting relationship with the lowermost member of said series of tags, between said electric stapling machine and a power source and a transversely and forwardly movable tag propelling member having spaced pairs of tag engaging portions thereupon, an actuating switch within said container engageable by said tag propelling member, one of said pairs of tag engaging portions being adapted to abut the rear side portion of the topmost member of the series of tags within said container, each pair of tag engaging portions being in alignment with the positions taken by said guide members upon said container, said switch member being closed by the tag propelling member at the most forward position of said tag propelling member, said tag propelling member being also in engageable relationship with the topmost member of said series of tags and adapted to propel said topmost member away from said stack of tags through the space between said overlying portion and laterally projecting portion of said guide members and into fastening position over said anvil.

8. An automatically tag feeding tag attaching electrical stapling machine comprising a supporting frame having a downwardly depending leg portion thereupon, an electrically operated stapling head pivotally secured to the upper part of said frame and projecting therefrom, a tag feeding mechanism secured to the leg portion of said frame, said tag feeding mechanism comprising an openable container having a forward portion and a pivotally movable rear portion, fastening means upon said rear portion and complementary fastening means upon said forward portion, spring means upon said container normally urging said forward and rear portions into locked relationship, said container being adapted to hold a series of tags in vertically stacked relationship therewithin, an anvil forwardly disposed upon said container and in spaced relationship with said stapling head, first switch means, switch trigger means adjacent said anvil and between said stapling machine and a power source, a pair of laterally aligned pivotally movable guide members within said container, each of said guide members being adjacent a side of said container and adapted to engage a side of said tags, each of said guide members having a laterally projecting portion extending along the length thereof and formed with an arcuate upper face, and an overlying portion formed with a downwardly depending portion upon its lower face, said arcuate upper face of the laterally projecting portion and the downwardly depending portion upon said overlying portion being spaced from one another by the thickness of one and one half tags; means for positioning said guide members upon said container; a tag holding abutment upon said container rearward of said guide members, a spring propelled vertically movable tag positioning member spaced both transversely and laterally from said guide members, said tag positioning member being adapted to lie in abutting relationship with the lowermost member of said series of tags, second switch means within said container between said stapling machine and a power source, a transversely and forwardly movable tag propelling member pivotally secured to said container, said tag propelling member having switch actuating means thereupon adapted to close said second switch means when said tag propelling member assumes its most forward position, said tag propelling member having spaced pairs of tag engaging portions thereupon, one of said pairs of tag engaging portions being adapted to abut the rear side portion of the topmost member of the series of tags within said container, each pair of tag engaging portions being in alignment with the positions taken by said guide members upon said container, said tag propelling member being also in engageable relationship with the topmost member of said series of tags and adapted to propel said topmost member away from said stack of tags through the space between said overlying portion and laterally projecting portion of said guide members over said anvil and into contact with said switch trigger means, said stapling machine being actuated by closure of said first and second switch means so as to secure a tag.

9. In a tag feeding apparatus the improvement which comprises a pair of members adapted to engage the opposite side portions of a series of tags in stacked relationship therewithin, each of said guide portions having a laterally projecting portion formed with an arcuate upper face and an overlying portion having an arcuate downwardly depending portion thereupon, said downwardly depending portion and said arcuate upper face being spaced from one another by at least the thickness of one tag but less than the thickness of two tags, and means for propelling a tag through the space between said arcuate upper face and downwardly depending portion.

10. An improvement as set forth in claim 9 wherein the space between said arcuate upper face and downwardly depending portion is equivalent to the thickness of one and one half tags.

References Cited in the file of this patent

UNITED STATES PATENTS

| | | |
|---|---|---|
| 318,024 | Powell | May 19, 1885 |
| 389,873 | Clark | Sept. 25, 1888 |
| 665,092 | Henius | Jan. 1, 1901 |
| 847,863 | Watts | Mar. 19, 1907 |
| 1,241,188 | Blakemore | Sept. 25, 1917 |
| 1,874,622 | Ranney | Aug. 30, 1932 |
| 1,911,627 | Lashar | May 30, 1933 |
| 2,508,942 | Funk | May 23, 1950 |
| 2,569,355 | Tubbs | Sept. 25, 1951 |
| 2,778,019 | Weimont | Jan. 22, 1957 |